United States Patent
Kalevo et al.

(10) Patent No.: US 7,295,713 B2
(45) Date of Patent: Nov. 13, 2007

(54) METHOD FOR ENCODING IMAGES, AND AN IMAGE CODER

(75) Inventors: Ossi Kalevo, Toijala (FI); Joni Henrikki Vahteri, Tampere (FI); Bogdan-Paul Dobrin, Helsinki (FI); Marta Karczewicz, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/146,196

(22) Filed: Jun. 6, 2005

(65) Prior Publication Data

US 2005/0254717 A1  Nov. 17, 2005

Related U.S. Application Data

(62) Division of application No. 09/766,193, filed on Jan. 19, 2001, now Pat. No. 6,907,142.

(30) Foreign Application Priority Data

Jan. 21, 2000 (FI) .................................. 20000131

(51) Int. Cl.
*G06K 9/36* (2006.01)
(52) U.S. Cl. ...................... 382/238; 382/232; 382/233; 382/236
(58) Field of Classification Search ................ 382/236, 382/252, 239, 238, 232, 260, 210, 162; 375/240.16, 375/238; 358/1.9, 463
See application file for complete search history.

(56) References Cited

U.S. PATENT DOCUMENTS

| | | | |
|---|---|---|---|
| 5,231,484 A | 7/1993 | Gonzales et al. ........... 375/240 |
| 5,253,056 A * | 10/1993 | Puri et al. .............. 375/240.01 |
| 6,181,829 B1 * | 1/2001 | Clark et al. ................. 382/273 |
| 6,233,392 B1 * | 5/2001 | Comer ........................ 386/68 |
| 6,385,245 B1 * | 5/2002 | De Haan et al. ........ 375/240.16 |
| 6,438,267 B1 * | 8/2002 | Kondo et al. ............... 382/252 |
| 6,512,550 B1 * | 1/2003 | de Garrido et al. ......... 348/452 |

(Continued)

FOREIGN PATENT DOCUMENTS

CA          2231484          9/1997

(Continued)

OTHER PUBLICATIONS

Golchin et al., "A Lossless Image Coder With Context Classification, Adaptive Prediction and Adaptive Entropy Coding," IEEE, vol. 5, May 1998, pp. 2545-2548.

(Continued)

*Primary Examiner*—Anh Hong Do
(74) *Attorney, Agent, or Firm*—Perman & Green, LLP

(57) ABSTRACT

The invention relates to a method for encoding a digital image, in which method the digital image is divided into blocks (C, L, U, UL, UR). In the method a spatial prediction for a block (C) is performed to reduce the amount of information to be transmitted, wherein at least one prediction method (P1-P13) is defined. In the method a classification is determined for at least one neighbouring block (L, U) of said block (C) to be predicted according to the contents of said neighbouring block (L, U), and a prediction method (P1-P13) is selected for the current block (C) on the basis of at least one said classification.

12 Claims, 10 Drawing Sheets

U.S. PATENT DOCUMENTS

Figure 1:
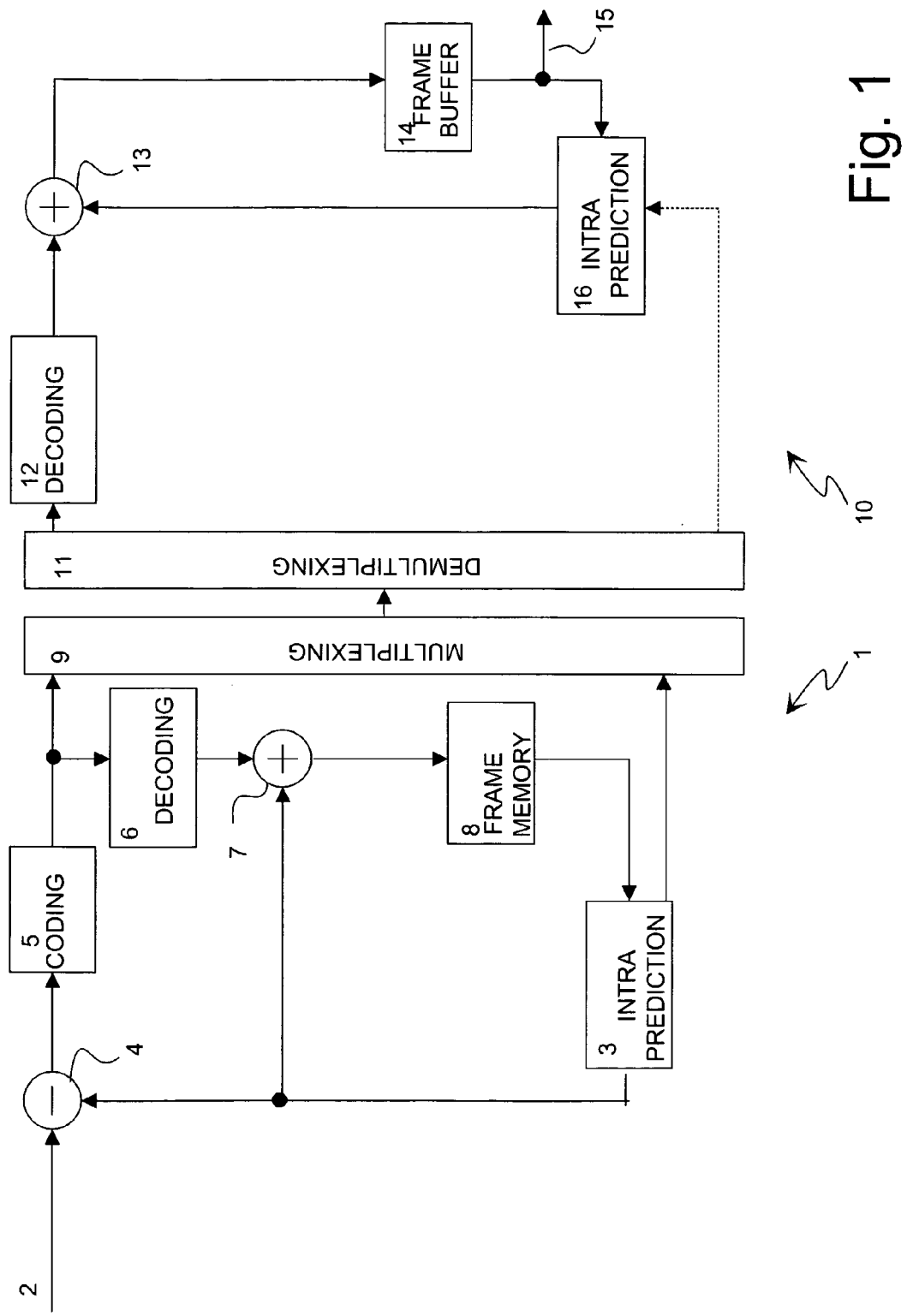

| | | | |
|---|---|---|---|
| 6,563,953 B2 | 5/2003 | Lin et al. | 382/233 |
| 6,590,934 B1 | 7/2003 | Kim | 375/240 |
| 6,636,565 B1 | 10/2003 | Kim | 375/240 |
| 6,795,586 B1 * | 9/2004 | Gindele et al. | 382/260 |

FOREIGN PATENT DOCUMENTS

| | | |
|---|---|---|
| EP | 0863674 | 9/1998 |
| EP | 0895424 A2 | 2/1999 |
| EP | 0933948 A2 | 8/1999 |
| EP | 0966621 A1 | 12/1999 |
| JP | 10224804 A | 8/1998 |
| WO | WO99/25122 | 2/1999 |

OTHER PUBLICATIONS

A Lossless Image Coder With Context Classification, Adaptive Prediction And Adaptive Entropy Coding, Golchin and Paliwal, 1998, pp. 2545-2548, School Of Microelectronic Engineering Griffith University.

A Study On Coding of Arbitrarily-Shaped VOP Using Cost Functions, Yatabe et al, 1998, p. 105, Faculty of Science and Technology, Science University Tokyo.

Japanese Office Action Translation, Patent Application Number 2001-553307, Mailing Date Mar. 20, 2007.

ITU Telecommunications Standardization Sector, Study Group 16, Video Coding Experts Group (Question 15), "MVC Video Codec-Proposal for H.26L", Oct. 28, 1998.

* cited by examiner

METHOD FOR ENCODING IMAGES, AND AN IMAGE CODER

(b) CROSS-REFERENCE TO RELATED APPLICATIONS

This is a divisional of U.S. Ser. No. 09/766,193 filed Jan. 19, 2001 now U.S. Pat. No. 6,907,142.

(c) STATEMENT REGARDING FEDERALLY SPONSORED RESEARCH OR DEVELOPMENT

Not Applicable

(d) INCORPORATION-BY-REFERENCE OF MATERIAL SUBMITTED ON A COMPACT DISC

Not Applicable

(e) BACKGROUND OF THE INVENTION (1) Field of the Invention

The present invention relates to a method for encoding images according to the preamble of claim 1. The present invention also relates to a device for encoding images according to the preamble of claim 12. Furthermore, the present invention relates to an encoder according to the preamble of claim 23, to a decoder according to the preamble of claim 24, to a codec according to the preamble of claim 25, to a mobile terminal according to the preamble of claim 26, and a storage medium for storing a software program according to the preamble of claim 27.

(2) Description of Related Art including information disclosed under 37 CFR 1.97 and 1.97

The image can be any digital image, a video image, a TV image, an image generated by a video recorder, a computer animation, a still image, etc. In general, a digital image consists of pixels, are arranged in horizontal and vertical lines, the number of which in a single image is typically tens of thousands. In addition, the information generated for each pixel contains, for instance, luminance information relating to the pixel, typically with a resolution of eight bits, and in colour applications also chrominance information, e.g. a chrominance signal. This chrominance signal generally consists of two components, Cb and Cr, which are both typically transmitted with a resolution of eight bits. On the basis of these luminance and chrominance values, it is possible to form information corresponding to the original pixel on the display device of a receiving video terminal. In this example, the quantity of data to be transmitted for each pixel is 24 bits uncompressed. Thus, the total amount of information for one image amounts to several megabits. In the transmission of a moving image, several images are transmitted per second. For instance in a TV image, 25 images are transmitted per second. Without compression, the quantity of information to be transmitted would amount to tens of megabits per second. However, for example in the Internet data network, the data transmission rate can be in the order of 64 kbits per second, which makes uncompressed real time image transmission via this network practically impossible.

To reduce the amount of information to be transmitted, a number of different compression methods have been developed, such as the JPEG, MPEG and H.263 standards. In the transmission of video, image compression can be performed either as inter-frame compression, intra-frame compression, or a combination of these. In inter-frame compression, the aim is to eliminate redundant information in successive image frames. Typically, images contain a large amount of non-varying information, for example a motionless background, or slowly changing information, for example when the subject moves slowly. In inter-frame compression, it is also possible to utilize motion compensated prediction, wherein the aim is to detect elements in the image which are moving, wherein motion vector and prediction error information are transmitted instead of transmitting the pixel values.

To enable the use of image compression techniques in real time, the transmitting and receiving video terminal should have a sufficiently high processing speed that it is possible to perform compression and decompression in real time.

In several image compression techniques, an image signal in digital format is subjected to a discrete cosine transform (DCT) before the image signal is transmitted to a transmission path or stored in a storage means. Using a DCT, it is possible to calculate the frequency spectrum of a periodic signal, i.e. to perform a transformation from the time domain to the frequency domain. In this context, the word discrete indicates that separate pixels instead of continuous functions are processed in the transformation. In a digital image signal, neighbouring pixels typically have a substantial spatial correlation. One feature of the DCT is that the coefficients established as a result of the DCT are practically uncorrelated; hence, the DCT conducts the transformation of the image signal from the time domain to the (spatial) frequency domain in an efficient manner, reducing the redundancy of the image data. As such, use of transform coding is an effective way of reducing redundancy in both inter-frame and intra-frame coding.

Current block-based coding methods used in still image coding and video coding for independently coded key frames (intra-frames) use a block-based approach. In general, an image is divided into N×M blocks that are coded independently using some kind of transform coding. Pure block-based coding only reduces the inter-pixel correlation within a particular block, without considering the inter-block correlation of pixels. Therefore, pure block-based coding produces rather high bit rates even when using transform-based coding, such as DCT coding, which has very efficient energy packing properties for highly correlated data. Therefore, current digital image coding standards exploit certain methods that also reduce the correlation of pixel values between blocks.

Current digital image coding methods perform prediction in the transform domain, i.e. they try to predict the DCT coefficients of a block currently being coded using the previous coded blocks and are thus coupled with the compression method. Typically a DCT coefficient that corresponds to the average pixel value within an image block is predicted using the same DCT coefficient from the previous coded block. The difference between the actual and predicted coefficient is sent to decoder. However, this scheme can predict only the average pixel value, and it is not very efficient.

Prediction of DCT coefficients can also be performed using spatially neighbouring blocks. For example, a DCT coefficient that corresponds to the average pixel value within a block is predicted using the DCT coefficient(s) from a block to the left or above the current block being coded. DCT coefficients that correspond to horizontal frequencies (i.e. vertical edges) can be predicted from the block above the current block and coefficients that correspond to vertical frequencies (i.e. horizontal edges) can be predicted from the block situated to the left. Similar to the previous method, differences between the actual and predicted coefficients are coded and sent to the decoder. This approach allows prediction of horizontal and vertical edges that run through several blocks.

In MPEG-2 compression, the DCT is performed in blocks using a block size of 8×8 pixels. The luminance level is transformed using full spatial resolution, while both chrominance signals are subsampled. For example, a field of 16×16 pixels is subsampled into a field of 8×8 pixels. The differences in the block sizes are primarily due to the fact that the eye does not discern changes in chrominance equally well as changes in luminance, wherein a field of 2×2 pixels is encoded with the same chrominance value.

The MPEG-2 standard defines three frame types: an I-frame (Intra), a P-frame (Predicted), and a B-frame (Bi-directional). An I-frame is generated solely on the basis of information contained in the image itself, wherein at the receiving end, an I-frame can be used to form the entire image. A P-frame is typically formed on the basis of the closest preceding I-frame or P-frame, wherein at the receiving stage the preceding I-frame or P-frame is correspondingly used together with the received P-frame. In the composition of P-frames, for instance motion compensation is used to compress the quantity of information. B-frames are formed on the basis of a preceding I-frame and a following P- or I-frame. Correspondingly, at the receiving stage it is not possible to compose the B-frame until the preceding and following frames have been received. Furthermore, at the transmission stage the order of the P- and B-frames is changed, wherein the P-frame following the B-frame is received first. This tends to accelerate reconstruction of the image in the receiver.

Intra-frame coding schemes used in prior art solutions are inefficient, wherein transmission of intra-coded frames is bandwidth-excessive. This limits the usage of independently coded key frames in low bit rate digital image coding applications.

The present invention addresses the problem of how to further reduce redundant information in image data and to produce more efficient coding of image data, by introducing a spatial prediction scheme involving the prediction of pixel values, that offers a possibility for prediction from several directions. This allows efficient prediction of edges with different orientations, resulting in considerable savings in bit rate. The method according to the invention also uses context-dependent selection of suitable prediction methods, which provides further savings in bit rate.

The invention introduces a method for performing spatial prediction of pixel values within an image. The technical description of this document introduces a method and system for spatial prediction that can be used for block-based still image coding and for intra-frame coding in block-based video coders. Key elements of the invention are the use of multiple prediction methods and the context-dependent selection and signalling of the selected prediction method. The use of multiple prediction methods and the context-dependent selection and signalling of the prediction methods allow substantial savings in bit rate to be achieved compared with prior art solutions.

It is an object of the present invention to improve encoding and decoding of digital images such that higher encoding efficiency can be achieved and the bit rate of the encoded digital image can be further reduced.

According to the present invention, this object is achieved by an encoder for performing spatially predicted encoding of image data.

(f) BRIEF DESCRIPTION OF THE INVENTION

According to a first aspect of the invention there is provided a method for encoding a digital image, in which method the digital image is divided into blocks, characterized in that in the method a spatial prediction for a block is performed to reduce the amount of information to be transmitted, wherein at least one prediction method is defined, a classification is determined for at least one neighbouring block of said block to be predicted according to the contents of said neighbouring block, and a prediction method is selected for the current block on the basis of at least one said classification.

According to a second aspect of the invention there is provided a device for encoding a digital image, which is divided into blocks, characterized in that the device comprises means for performing spatial prediction for a block to reduce the amount of information to be transmitted, wherein at least one prediction method has been defined, that the device further comprises means for determining a classification for at least one neighbouring block of said block to be predicted according to the contents of said neighbouring block, and means for selecting a prediction method for the current block on the basis of at least one said classification.

According to a third aspect of the invention there is provided an encoder comprising means for encoding a digital image, and means for dividing the digital image into blocks, characterized in that the encoder comprises means for performing spatial prediction for a block to reduce the amount of information to be transmitted, wherein at least one prediction method has been defined, that the encoder further comprises means for determining a classification for at least one neighbouring block of said block to be predicted according to the contents of said neighbouring block, and means for selecting a prediction method for the current block on the basis of at least one said classification.

According to a fourth aspect of the invention there is provided a decoder comprising means for decoding a digital image, which is divided into blocks, characterized in that the decoder comprises means for performing spatial prediction for a block to reduce the amount of information to be transmitted, wherein at least one prediction method has been defined, that the decoder further comprises means for determining a classification for at least one neighbouring block of said block to be predicted according to the contents of said neighbouring block, and means for selecting a prediction method for the current block on the basis of at least one said classification.

According to a fifth aspect of the invention there is provided a codec comprising means for encoding a digital image, means for dividing the digital image into blocks, and means for decoding a digital image, characterized in that the codec comprises means for performing spatial prediction for a block to reduce the amount of information to be transmitted, wherein at least one prediction method has been defined, that the codec further comprises means for determining a classification for at least one neighbouring block of said block to be predicted according to the contents of said neighbouring block, and means for selecting a prediction method for the current block on the basis of at least one said classification.

According to a sixth aspect of the invention there is provided a mobile terminal comprising means for encoding a digital image, means for dividing the digital image into blocks, and means for decoding a digital image, characterized in that the mobile terminal comprises means for performing spatial prediction for a block to reduce the amount of information to be transmitted, wherein at least one prediction method has been defined, that the mobile terminal further comprises means for determining a classification for at least one neighbouring block of said block to be predicted according to the contents of said neighbouring block, and means for selecting a prediction method for the current block on the basis of at least one said classification.

According to a seventh aspect of the invention there is provided a storage medium for storing a software program comprising machine executable steps for encoding a digital image, and for dividing the digital image into blocks, characterized in that the software program further comprises machine executable steps for performing spatial prediction for a block to reduce the amount of information to be transmitted, wherein at least one prediction method has been defined, steps for determining a classification for at least one neighbouring block of said block to be predicted according to the contents of said neighbouring block, and steps for selecting a prediction method for the current block on the basis of at least one said classification.

The invention is based on the idea that to perform spatial prediction of pixel values for a block to be coded, adjacent decoded blocks are examined to determine if there exists some directionality in the contents of the adjacent blocks. This directionality information is then used to classify the blocks. Based on the combination of the classes of the adjacent blocks, the contents (pixel values) of the current block are then predicted using a suitable prediction method. The prediction method is signalled to the decoder. Prediction error information is also sent if it is efficient to do that in a distortion vs. bit-rate sense.

Considerable advantages are achieved with the present invention when compared with solutions of prior art. Using a method according to the invention, it is possible to reduce the amount of information needed when transmitting images in digital format.

In general, the method according to the invention can be applied to block-based still image coding as well as to intra-frame coding in a block-based digital image coder.

(g) BRIEF DESCRIPTION OF THE SEVERAL VIEWS OF THE DRAWING(S)

Figure 2:
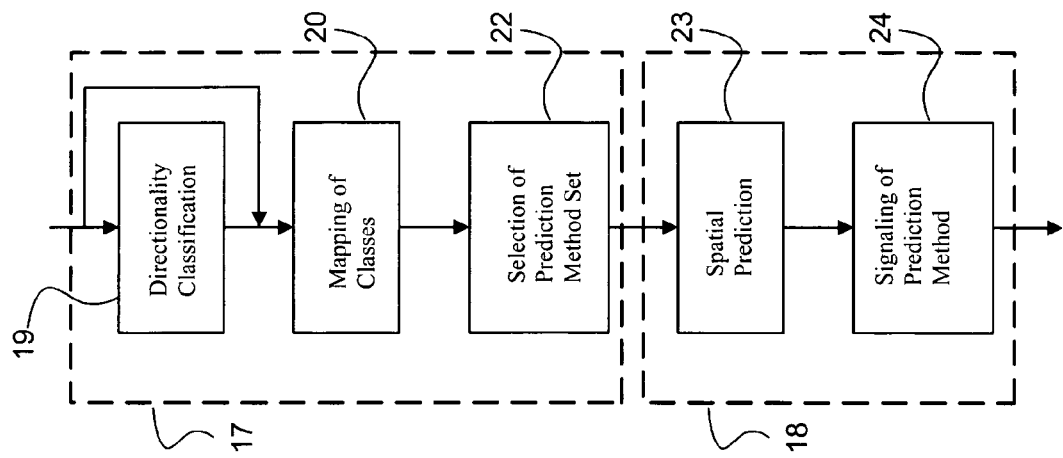
Figure 3C:
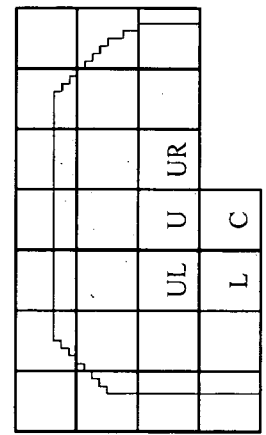
Figure 3A:
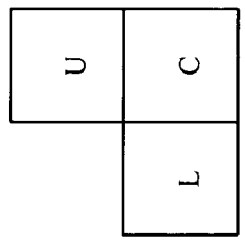
Figure 3B:
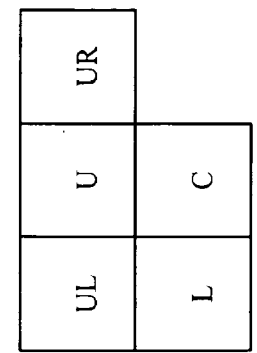
Figure 4:
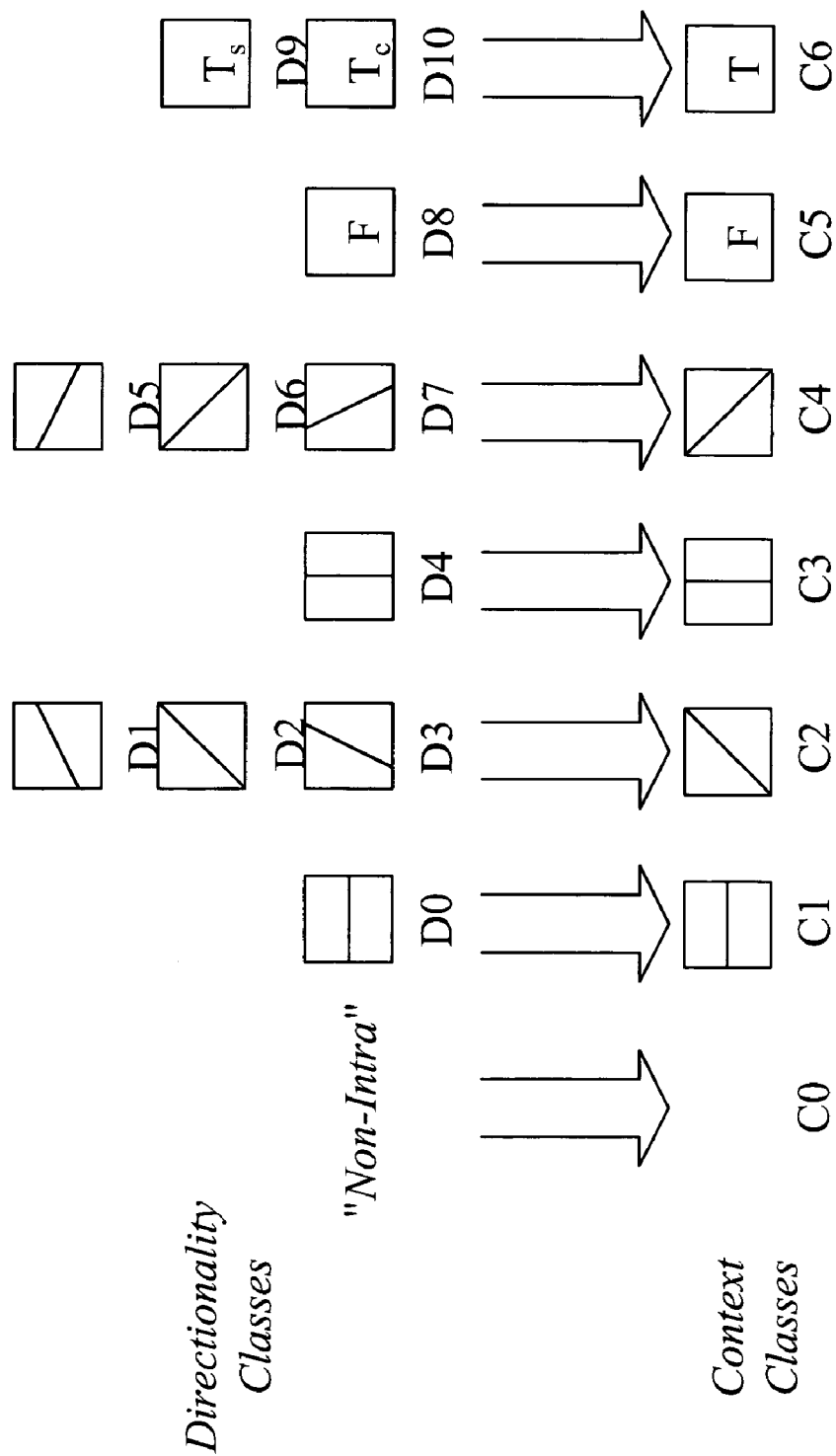
Figure 5C:
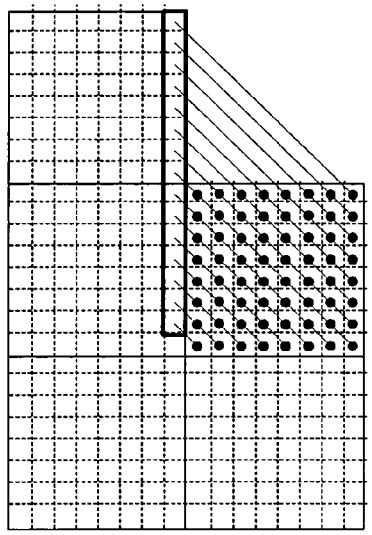
Figure 5F:
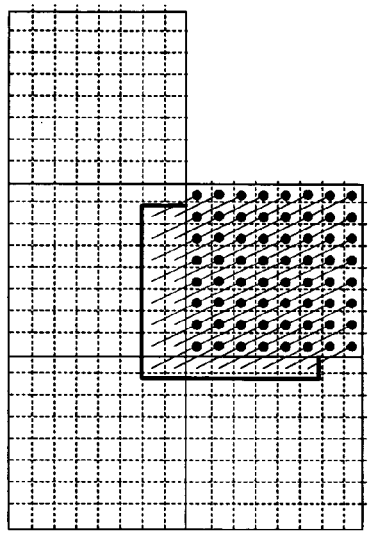
Figure 5B:
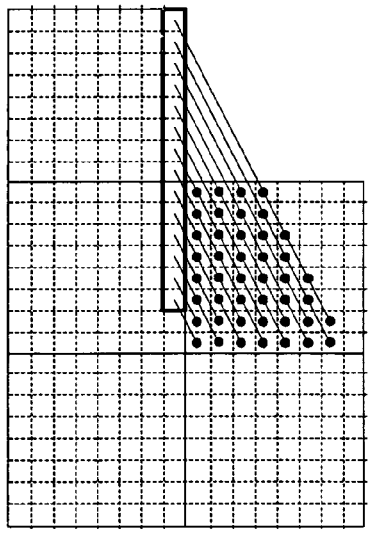
Figure 5E:
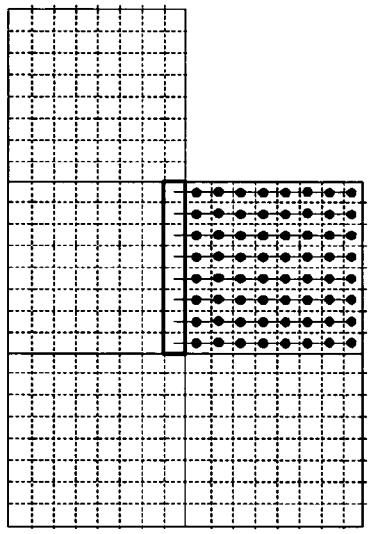
Figure 5A:
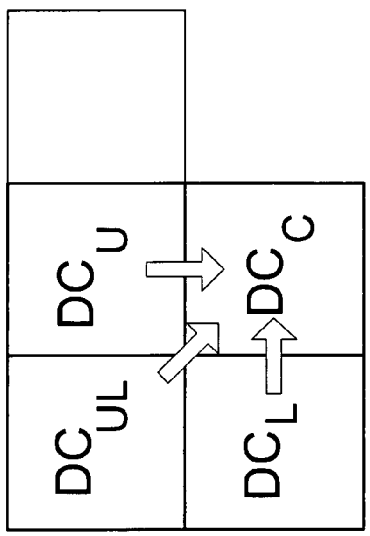
Figure 5D:
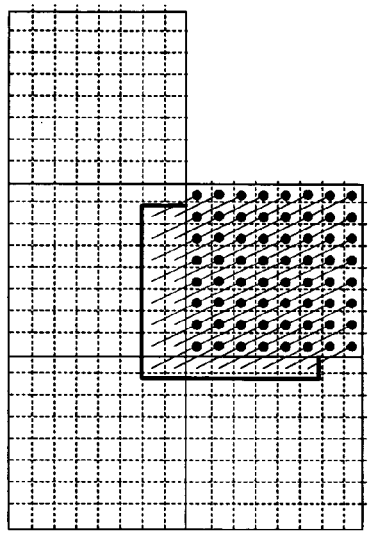
Figure 5I:
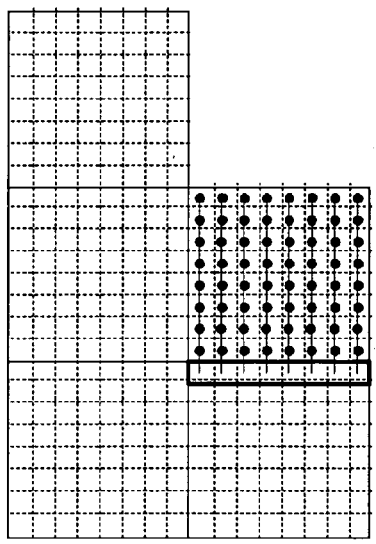
Figure 5L:
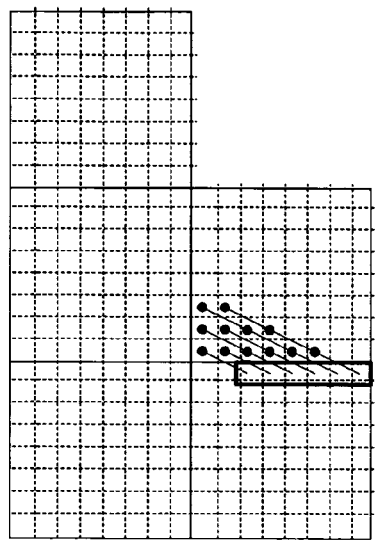
Figure 5H:
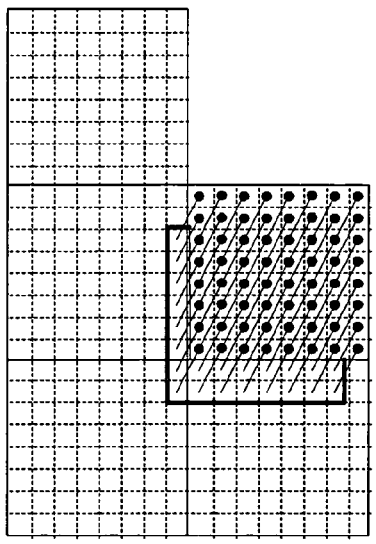
Figure 5K:
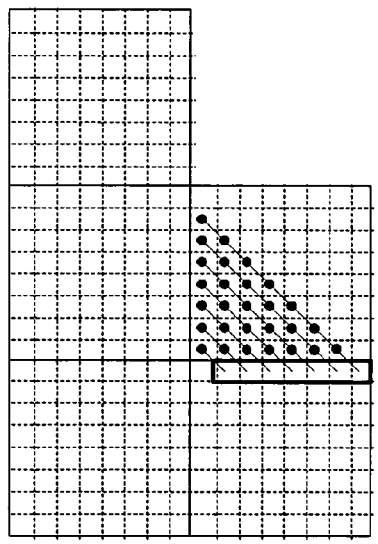
Figure 5G:
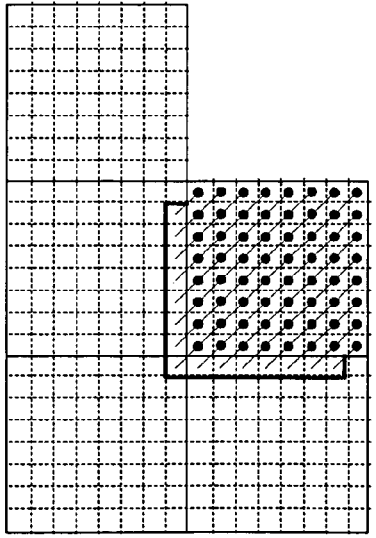
Figure 5J:
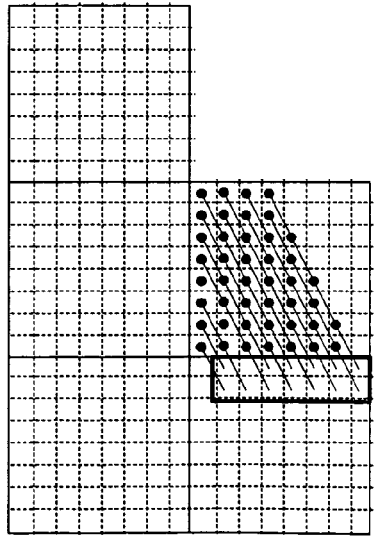
Figure 5M:
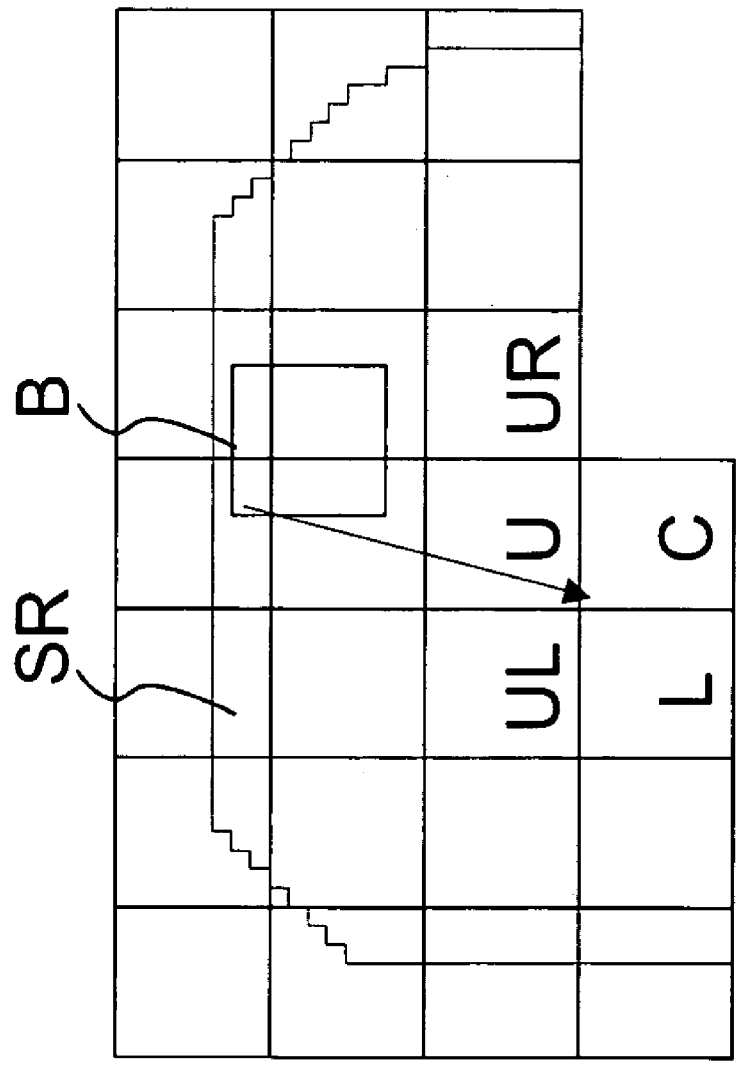
Figure 5P:
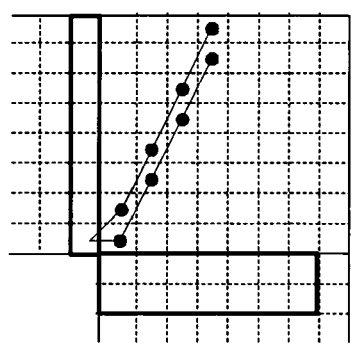
Figure 6:
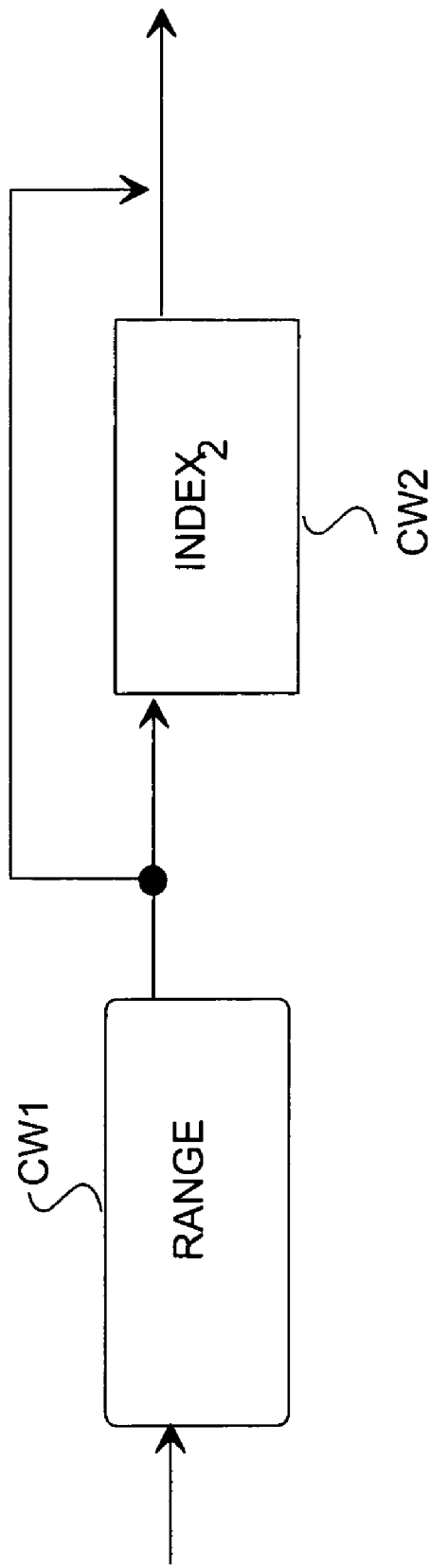
Figure 7:
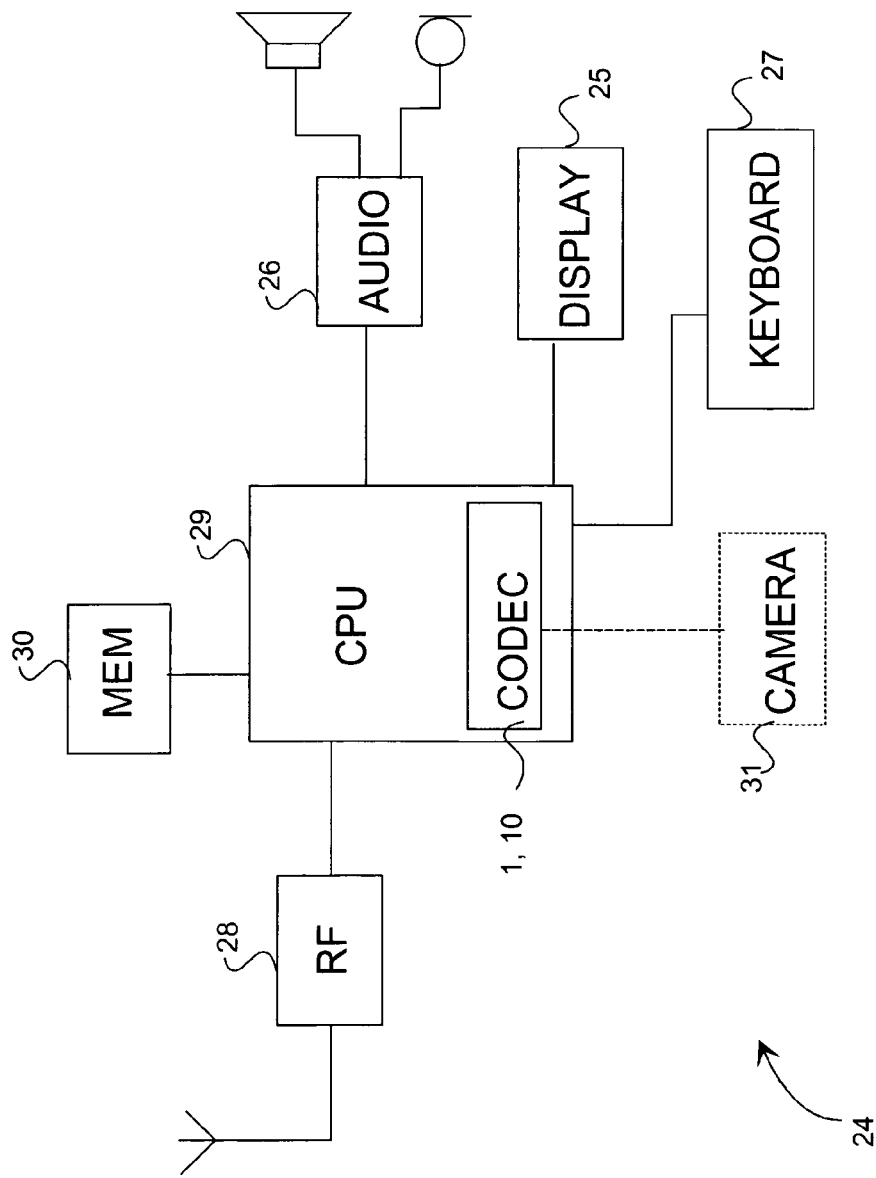

In the following, the invention will be described in more detail with reference to the appended figures, in which FIG. 1 shows the structure of a digital image transmission system, FIG. 2 illustrates the spatial prediction method of the present invention in the form of a block diagram, FIGS. 3a-3c show an illustration of blocks that are used for prediction according to an advantageous embodiment of the present invention, FIG. 4 shows the mapping of directionality classes to context classes according to an advantageous embodiment of the present invention, FIGS. 5a-5p show an illustration of pixels that are used for prediction according to an advantageous embodiment of the present invention, FIG. 6 shows an advantageous bit-stream syntax used in the transmission of displacement information, and FIG. 7 is a schematic representation of a portable communications device implementing a method according to the invention.

(h) DETAILED DESCRIPTION OF THE INVENTION

The intra-frame prediction method described in this invention operates in a block-based manner and can be applied to image frames that comprise N×M blocks scanned e.g. row by row from left to right and from top to bottom. It is obvious that other scanning directions can also be used in connection with the present invention. Spatial prediction is performed for each intra-coded block using previously reconstructed blocks in the same frame. The residual error can be compressed using any suitable method, e.g. using DCT, as in current standards. It should also be appreciated that the method according to the invention may be applied equally well to both monochrome and colour images.

The system according to the invention consists of two main parts, as illustrated in FIG. 2. Firstly, context-dependent selection 17 of a suitable subset of prediction methods is performed by classifying neighbouring reconstructed blocks. Secondly, a prediction block is constructed 18 using one of the prediction methods in the selected subset and the prediction method is signalled to decoder.

Context-dependent selection of a prediction method subset comprises directionality classification of possible neighbouring blocks, mapping of directionality classes to context classes and context-dependent selection of an appropriate prediction method subset.

In the following, the transmission and reception of digital image frames in a transmission system is described with reference to the digital image transfer arrangement presented in FIG. 1. The current frame arrives at the transmission system 1 as input data 2 provided, for example, as the output of a digital video camera. The current frame may be provided in its entirety (i.e. a complete frame comprising N×M image blocks), in which case the frame is stored, or the transmission system 1 may receive the input data block by block. The blocks of the frame are directed one by one to a summer 4, where prediction error of a block is calculated e.g. by subtracting a block of the frame from a predicted block. The prediction error is coded in a coder 5 and decoded in a decoder 6. In summer 7 the decoded prediction error is summed with predicted blocks and the result is saved in a frame memory 8. The prediction estimator 3, where spatial prediction is performed according to the method of the invention, receives blocks to be used with prediction from the frame memory 8.

In order to form a new prediction block, the prediction estimator 3 examines, if there exists some directionality in possible neighbouring blocks of the current block. This scheme is illustrated in FIG. 3a. The reference C denotes the current block, the reference L denotes a first neighbouring block of the current block and the reference U denotes a second neighbouring block of the current block. In this advantageous embodiment of the invention, the first neighbouring block is to the left of the current block C and the second neighbouring block is above the current block C. If the scanning order is different from left to right and from top to bottom, the first neighbouring block L and the second neighbouring block U are not necessarily to the left of and above the current block C, respectively. The neighbouring blocks L, U are blocks adjacent to the current block C which have already been reconstructed. In some embodiments of the invention more than two blocks can be classified and used to select the prediction method for the current block C. However, in the following description of a preferred embodiment of the invention, a maximum of two neighbouring blocks L, U are classified for each block C under examination. Furthermore, the classification is performed only if a neighbouring block L or U exists. If a current block does not have any neighbouring blocks, it is treated as "Non-Intra" during context-dependent selection of prediction methods, as will be explained further later in the text.

Prediction can also be implemented in such a way that it is performed using only already reconstructed intra-coded blocks. In this case, all blocks other than intra-coded blocks are treated as "Non-Intra".

The first neighbouring block L and the second neighbouring block U are classified according to the directionality of image details inside the block. As illustrated in FIG. 2, directionality classifier 19 analyses the directionality of the neighbouring blocks using pixel value gradients. As a result, each neighbouring block is mapped 20 into an output class. In an advantageous embodiment of the invention there are 11 such output classes, but it is obvious that the number of output classes may vary. Advantageously, the output classes consist of 8 directionality classes D0-D7 corresponding to edge orientations k·22.5°, k=0, 1, . . . , 7 and 3 non-directional classes D8-D10 corresponding to flat, smooth texture and coarse texture blocks. In alternative embodiments of the invention, the number of directionality classes and the way in which they are defined may vary.

In the system of FIG. 1, the prediction estimator 3 first examines if the first neighbouring block L and/or the second neighbouring block U exist. If either one of these blocks does not exist, that neighbouring block is defined as a C0 block ("Non-Intra"), i.e. the current block C is on the edge or in a corner of the frame, or on the edge or in a corner of an area consisting of Intra blocks. Then, the prediction estimator 3 selects a suitable prediction method for the current block C, as described later in this description. Otherwise, the prediction estimator 3 calculates gradient information relating to the block or blocks L, U.

There are many suitable methods for calculating the gradient information. In the following, one advantageous method is described. First, average absolute directional gradients $g_k$, k=0, 1, . . . , 7 of a block L, U are defined as $$g_0 = \frac{1}{N(N-1)} \max\left(1, \sum_{y=0}^{N-1}\sum_{x=0}^{N-2} |I(x,y) - I(x+1,y)|\right) \quad (1)$$

$$g_1 = \frac{1}{(N-1)^2} \max\left(1, \sum_{y=0}^{N-2}\sum_{x=1}^{N-1} \left|I(x,y) - \frac{1}{2}(I(x-1,y) + I(x-1,y+1))\right|\right)$$

$$g_2 = \frac{1}{(N-1)^2} \max\left(1, \sum_{y=0}^{N-2}\sum_{x=1}^{N-1} |I(x,y) - I(x-1,y+1)|\right)$$

$$g_3 = \frac{1}{(N-1)^2} \max\left(1, \sum_{y=0}^{N-2}\sum_{x=1}^{N-1} \left|I(x,y) - \frac{1}{2}(I(x-1,y+1) + I(x,y+1))\right|\right)$$

$$g_4 = \frac{1}{N(N-1)} \max\left(1, \sum_{y=0}^{N-2}\sum_{x=0}^{N-1} |I(x,y) - I(x,y+1)|\right)$$

$$g_5 = \frac{1}{(N-1)^2} \max\left(1, \sum_{y=0}^{N-2}\sum_{x=0}^{N-2} \left|I(x,y) - \frac{1}{2}(I(x,y+1) + I(x+1,y+1))\right|\right)$$

$$g_6 = \frac{1}{(N-1)^2} \max\left(1, \sum_{y=0}^{N-2}\sum_{x=0}^{N-2} |I(x,y) - I(x+1,y+1)|\right)$$

$$g_7 = \frac{1}{(N-1)^2} \max\left(1, \sum_{y=0}^{N-2}\sum_{x=0}^{N-2} \left|I(x,y) - \frac{1}{2}(I(x+1,y) + I(x+1,y+1))\right|\right)$$

where N is the size of the block and I(x,y) represent the pixel intensity values. Indices x and y refer to the co-ordinates of a pixel inside the block and k represents edge orientations. The prediction estimator 3 calculates the gradient values $g_k$ according to the formulae above.

Using the gradient values $g_k$, gradient ratios $r_k$, k=0, 1, . . . , 7 are defined as the ratio between the gradient value in a certain direction and gradient value in the orthogonal direction:

$$r_0 = \frac{g_0}{g_4}, \quad r_1 = \frac{g_1}{g_5}, \quad r_2 = \frac{g_2}{g_6}, \quad r_3 = \frac{g_3}{g_7} \quad (2)$$

$$r_4 = \frac{1}{r_0}, \quad r_5 = \frac{1}{r_1}, \quad r_6 = \frac{1}{r_2}, \quad r_7 = \frac{1}{r_3}$$

Based on the absolute gradient values $g_k$ and gradient ratios $r_k$ defined in (1) and (2), classification of the block is performed, advantageously according to the following classification steps 1-12 using some numerical values as thresholds. This classification process classifies each of the neighbouring blocks into one of a first set of block types D0-D10. The present invention is not limited to the values used in the algorithm, but the values used in the algorithm in the following steps are preferred. The method can also be applied to any block size.

In this advantageous embodiment of the invention the classification phase comprises 13 steps, but it is obvious that the classification may comprise also different number of steps.

Step 1

In this step the flatness of the block is checked. Prediction estimator 3 calculates gradient values $g_0$ and $g_4$. These correspond to gradient values for horizontal (0°) and vertical (90°) image details. If both $g_0 \leq 2.0$ and $g_4 \leq 2.0$, the block is classified as class D8 and the initial classification process terminates. Otherwise, classification step 2 is performed.

Step 2

In this step a further check for flatness of the block is performed. The rest of the gradient values $g_k$ are calculated, and the maximum gradient value $g_{max}=\max\{g_k\}$ is determined. The maximum gradient value $g_{max}$ is compared with 2.5. If $g_{max} \leq 2.5$ the block is classified as class D8 and the initial classification process terminates. Otherwise, the method continues from step 3.

Step 3

In step 3 a check for clear directionality is performed. The gradient ratios $r_k$ are calculated and the minimum gradient ratio $r_{min}=\min\{r_k\}$ is determined. When the minimum gradient ratio is found, the corresponding index $k_{min}$ is defined. If $r_{min} \leq 0.15$ the block is classified to corresponding class $Dk_{min}$ and the method continues from step 12, otherwise the method continues from step 4.

Step 4

In step 4 a check for texture is performed. The minimum gradient ratio $r_{min}$ is compared with 0.6. If $r_{min} \geq 0.6$ the method continues from step 13, otherwise the method continues from the next step.

Step 5

In step 5 the two smallest gradient ratios are checked to determine if they are clearly distinct. The gradient ratios $r_k$ are sorted in increasing order $r_{(0)} \leq r_{(1)} \leq r_{(2)} \ldots \leq r_{(7)}$. Also the gradient ratio indices are reordered according to the sorted order $k_{(0)}, k_{(1)}, k_{(2)}, \ldots k_{(7)}$. If $$r_{(1)} - r_{(0)} < \frac{1}{3}(r_{(2)} - r_{(1)})$$

the sixth classification step is performed next, otherwise the method continues from the 10th classification step.

Step 6

In step 6 the smallest gradient ratio is checked to determine if it corresponds to directionality class D2 or D6 and the smallest gradient ratio is small enough. The prediction estimator 3 first examines, whether the index of the gradient ratio $r_{(0)}$ is either 2 or 6, wherein the first gradient ratio $r_{(0)}$ is compared with 0.6. If $r_{(0)} \epsilon \{r_k | k=2,6\}$ and $r_{(0)} < 0.6$, the block is classified as corresponding to class $Dk_{(0)}$ and the method continues from step 12. Otherwise the method continues from step 7.

Step 7

In step 7 the prediction estimator 3 first examines if the index of the second gradient ratio $r_{(1)}$ is either 2 or 6, wherein the first gradient ratio $r_{(0)}$ is compared with 0.6. If $r_{(1)} \epsilon \{r_k | k=2,6\}$ and $r_{(0)} < 0.6$ the block is classified as corresponding to class $Dk_{(1)}$ and the method continues from the step 12, otherwise the method continues from Step 8.

Step 8

In step 8 the smallest gradient ratio is checked to determine if it corresponds to directionality class D1, D3, D5 or D7 and the smallest gradient ratio is small enough. The first gradient ratio $r_{(0)}$ is compared with 0.5. If $r_{(0)} \epsilon \{r_k | k=1,3,5,7\}$ and $r_{(0)} < 0.5$ the block is classified as corresponding to class $Dk_{(0)}$ and the method continues from step 12, otherwise the method continues from step 9.

Step 9

In step 9 the second gradient ratio is checked to determine if it corresponds to directionality class D1, D3, D5 or D7 and the smallest gradient ratio is small enough. The first gradient ratio $r_{(0)}$ is compared with 0.5, if $r_{(1)} \epsilon \{r_k | k=1,3,5,7\}$. If $r_{(0)} < 0.5$ the block is classified as corresponding to class $Dk_{(1)}$ and the method continues from step 12. Otherwise the method continues from step 10.

Step 10

Directionality is not yet found, therefore a (somewhat) higher threshold value compared with the threshold value used in Step 3 can be used to check the directionality. This means that a more uncertain examination is performed. Step 10 uses the values of threshold $T_1$ defined in Table 1, below. The values for $T_1$ are compared with the first gradient ratio. If $r_{(0)} < T_1$ as defined in Table 1, the block is classified as corresponding to class $Dk_{(0)}$ and the method continues from step 12. Otherwise the method continues from step 11.

TABLE 1

| Orientation Relation for $r_{(0)}$ | $T_1$ |
|---|---|
| $r_{(0)} \epsilon \{r_k | k = 2, 6\}$ | 0.5 |
| $r_{(0)} \epsilon \{r_k | k = 1, 3, 5, 7\}$ | 0.4 |
| $r_{(0)} \epsilon \{r_k | k = 0, 4\}$ | 0.3 |

Step 11

Directionality is not yet found, therefore in step 11 the three smallest gradient ratios are checked to determine if they are neighbours and if the smallest gradient ratio is in the middle. In that case a still higher threshold value compared with the threshold value used in Step 3 can be used to check the directionality. This means that a more uncertain examination is performed. Step 11 uses the values of threshold $T_2$ defined in Table 2, below. Then, if the directionalities corresponding to the second $r_{(1)}$ and the third gradient ratios $r_{(2)}$ are the closest neighbours for the directionality corresponding to the first gradient ratio $r_{(0)}$ and $r_{(0)} < T_2$ as defined in Table 2, the block is classified as corresponding to class $Dk_{(0)}$ and the method continues from step 12. Otherwise the method continues from step 13.

TABLE 2

| Orientation Relation for $r_{(0)}$ | $T_2$ |
|---|---|
| $r_{(0)} \in \{r_k | k = 2, 6\}$ | 0.6 |
| $r_{(0)} \in \{r_k | k = 1, 3, 5, 7\}$ | 0.5 |
| $r_{(0)} \in \{r_k | k = 0, 4\}$ | 0.4 |

Step 12

Step 12 performs a check that classification is really based on an edge in the image with a certain orientation rather than texture. Step 12 uses the values of threshold $T_3$ defined in Table 3, below. In Table 3 values for only two possible block sizes (8×8, 4×4) are shown, but in practical embodiments other block sizes can also exist, wherein respective values for $T_3$ are defined. In step 12 the minimum gradient value $g_{min} = \min\{g_k\}$ is examined. Depending on the classification and the size of the block, the threshold $T_3$ is chosen from Table 3. If $g_{min} \leq T_3$ the initial classification process terminates. Otherwise the method continues from step 13.

TABLE 3

| Classification of the Block | $T_3$ for 4 × 4 Block | $T_3$ for 8 × 8 Block |
|---|---|---|
| D2 and D6 | 9.0 | 7.0 |
| D1, D3, D5 and D7 | 11.5 | 9.0 |
| D0, D4 | 14.0 | 11.0 |

Step 13

Step 13 performs a check whether texture is smooth or coarse. The maximum gradient value $g_{max}$ is compared with 10.0. If $g_{max} \leq 10.0$ the block is classified as D9. Otherwise, the block is classified as D10. Step 13 is not necessarily needed, if both smooth and coarse texture are mapped into the same context class.

Next the selection 21 of a suitable prediction method is performed for the current block C. In a preferred embodiment of the invention, the selection phase is preceded by a mapping phase. The purpose of the mapping is to reduce the memory consumption of the implementation. Some of the directionality classes can be mapped together. The classes resulting from the mapping phase are called context classes and they are referred to with references C1-C6. In the preferred embodiment of the invention, the diagonal classes are combined to two alternative classes, one for bottom-left to top-right diagonality and the other for top-left to bottom-right diagonality.

Mild and steep diagonal classes D5, D6 and D7 are mapped to the first diagonal context class C4. Similarly, classes D1, D2 and D3 are mapped to the second diagonal context class C2. Further, the smooth texture class D9 and coarse texture class D10 are mapped together to produce texture context class C6. This mapping is illustrated in FIG. 4.

In addition to the 6 context classes C1-C6 there is one further context class C0 used for "Non-Intra" blocks. In general, a "Non-Intra" block is a block that does not exist, i.e. when block C is at an image boundary. If the prediction is implemented in such a way that only intra-coded blocks are used as a reference, the definition of a "Non-Intra" block is extended to those blocks that are not intra-coded.

In the preferred embodiment of the invention there are a total of 13 different prediction methods, which are depicted in FIGS. 5a-5p for 8×8 blocks. Prediction methods for other block sizes and context classes can be derived in a similar fashion. In each case, prediction is performed in a causal manner, using neighbouring reconstructed intra-coded blocks L, U, UL, UR as a reference. The region used for prediction depends on the prediction method, as depicted in FIGS. 3a and 3b, where block C is the current block to be coded. In the case of prediction methods P1-P12, the region from which blocks may be used for prediction is the area covered by four neighbouring blocks L, UL, U and R as shown in FIG. 3b. For prediction method P13, this region is larger, as depicted in FIG. 3c. It should be appreciated that in other embodiments of the invention, the number of prediction methods, the blocks used as prediction references, as well as the pixels within those blocks used to perform prediction, may vary.

In an advantageous embodiment of the method according to the invention, a subset of prediction methods for each context class combination is defined and the prediction methods are prioritized (ranked) in each subset. Then, the prediction method used to predict the content of the current block C is selected from a subset of prediction methods. The prediction methods within a subset differ from each other and correspond to those prediction methods that are most likely to provide an accurate prediction for block C, in the event of particular classifications being obtained for neighbouring blocks like L and U. One advantageous definition for the subsets is presented in Table 4 below.

Effectively, the results of context classification for the first neighbouring block L and second neighbouring block U are combined, i.e. both taken into consideration when selecting a prediction method for block C. The subset of prediction methods is selected from Table 4 according to the context information of the neighbouring blocks L, U. Each row of Table 4 defines the prediction method subset for a certain pair of context classes for neighbouring blocks L, U and the priority (rank) of the prediction methods in the subset. Ranking is used to simplify the context-dependent signalling of the prediction methods, as described later in this description. For example, if the first neighbouring block L is classified into context class C2 and the second neighbouring block U is classified into context class C4, the subset for this combination comprises prediction methods P1, P9, P5, P13, P7 and P6 (in ranking order). The prediction estimator 3 further selects the most appropriate prediction method from this subset, as detailed later in this description.

TABLE 4

| L Class | U Class | Rank 1 | Rank 2 | Rank 3 | Rank 4 | Rank 5 | Rank 6 |
|---|---|---|---|---|---|---|---|
| C0 | C0 | P1 | P5 | P11 | P9 | P8 | P4 |
|  | C1 | P1 | P9 | P5 | P8 | P2 | P13 |
|  | C2 | P1 | P5 | P2 | P13 | P11 | P3 |
|  | C3 | P5 | P13 | P1 | P9 | P12 | P7 |
|  | C4 | P1 | P8 | P5 | P9 | P6 | P7 |
|  | C5 | P1 | P8 | P5 | P3 | P2 | P10 |
|  | C6 | P1 | P5 | P9 | P13 | P8 | P12 |
| C1 | C0 | P9 | P1 | P2 | P13 | P8 | P10 |
|  | C1 | P9 | P1 | P13 | P2 | P5 | P10 |
|  | C2 | P9 | P1 | P2 | P5 | P3 | P11 |
|  | C3 | P9 | P5 | P1 | P13 | P4 | P11 |
|  | C4 | P9 | P1 | P13 | P5 | P3 | P7 |
|  | C5 | P9 | P1 | P13 | P2 | P8 | P10 |
|  | C6 | P9 | P1 | P13 | P5 | P11 | P2 |
| C2 | C0 | P1 | P9 | P10 | P11 | P12 | P7 |
|  | C1 | P9 | P1 | P10 | P5 | P11 | P2 |
|  | C2 | P1 | P11 | P10 | P2 | P3 | P12 |
|  | C3 | P5 | P1 | P11 | P9 | P4 | P13 |
|  | C4 | P1 | P9 | P5 | P13 | P7 | P6 |
|  | C5 | P1 | P9 | P10 | P11 | P2 | P7 |
|  | C6 | P1 | P11 | P9 | P5 | P12 | P10 |
| C3 | C0 | P5 | P1 | P12 | P9 | P13 | P7 |
|  | C1 | P1 | P9 | P5 | P13 | P3 | P11 |
|  | C2 | P5 | P1 | P9 | P4 | P13 | P3 |
|  | C3 | P5 | P1 | P13 | P9 | P12 | P11 |
|  | C4 | P1 | P5 | P9 | P6 | P13 | P7 |
|  | C5 | P1 | P5 | P9 | P13 | P3 | P6 |
|  | C6 | P5 | P1 | P11 | P13 | P9 | P12 |
| C4 | C0 | P1 | P9 | P7 | P8 | P6 | P13 |
|  | C1 | P9 | P1 | P5 | P13 | P8 | P7 |
|  | C2 | P1 | P5 | P9 | P13 | P7 | P11 |
|  | C3 | P5 | P1 | P13 | P9 | P7 | P11 |
|  | C4 | P1 | P13 | P7 | P9 | P5 | P8 |
|  | C5 | P1 | P7 | P9 | P13 | P8 | P4 |
|  | C6 | P1 | P9 | P13 | P5 | P7 | P8 |
| C5 | C0 | P1 | P9 | P10 | P11 | P6 | P7 |
|  | C1 | P1 | P9 | P5 | P8 | P10 | P13 |
|  | C2 | P1 | P5 | P11 | P4 | P13 | P10 |
|  | C3 | P5 | P1 | P13 | P10 | P6 | P4 |
|  | C4 | P1 | P8 | P5 | P13 | P10 | P7 |
|  | C5 | P1 | P9 | P3 | P5 | P8 | P13 |
|  | C6 | P1 | P9 | P5 | P13 | P10 | P8 |
| C6 | C0 | P1 | P9 | P2 | P5 | P6 | P11 |
|  | C1 | P9 | P1 | P5 | P13 | P2 | P3 |
|  | C2 | P1 | P9 | P5 | P13 | P2 | P11 |
|  | C3 | P5 | P1 | P9 | P13 | P12 | P11 |
|  | C4 | P1 | P9 | P5 | P10 | P7 | P13 |
|  | C5 | P1 | P9 | P13 | P2 | P5 | P7 |
|  | C6 | P1 | P9 | P5 | P13 | P11 | P12 |

In the following, the defined prediction methods are described in more detail.

Prediction Method P1

Prediction method P1 predicts the average pixel value of block C from the average pixel values of blocks L, UL, U and UR. The average pixel values dL, dUL and dU of the reconstructed blocks L, UL, and U are calculated as the integer division defined as $$d = \left( \sum_{x=0, y=0}^{N-1, N-1} I(x, y) + \frac{1}{2} N^2 \right) // N^2 \qquad (3)$$

where N is the size of the block, I(x,y) represents the pixel intensity values and "//" denotes division with truncation to integer value. The average pixel value dC of block C is predicted according to following set of rules (which are written below in the form of pseudo-code):
if all blocks L, U and UL exist, then
if dL=dU=dUL then dC=dUL
else if dUL=dU then dC=dL
else if dUL=dL then dC=dU
else if dL=dU then
if chrominance prediction then dC=dL
else if |dUL−dL|<4 then dC=s(dL+dU−dUL)
else dC=dL
else if dUL<dL<dU then dC=dU
else if dUL<dU<dL then dC=dL
else if dU<dL<dUL then dC=dU
else if dL<dU<dUL then dC=dL
else if dL<dUL<dU OR dU<dUL<dL then
dC=s(dL+dU−dUL)
else if blocks L and U exist then dC=(dL+dU+1)//2
else if blocks L and UL exist then dC=dL
else if blocks U and UL exist then dC=dU
else if block L exists then dC=dL
else if block U exists then dC=dU
else if block UL exists then dC=dUL
else dC=p where p is a value that is in the middle of the possible pixel value range, e.g. 128, "//" denotes division with truncation and s is a clipping function that restricts the values to the possible range of pixel values, e.g. between 0 and 255 in a system that uses an 8-bit representation of luminance/chrominance values. As a result, the prediction block for C is filled with pixels having a constant value given by dC. Prediction method P1 is illustrated in FIG. 5a.

Prediction Method P2-P4

Prediction methods P2 through P4 predict diagonal shapes in block C by extending image details from the upper right direction into block C. Prediction is performed by copying reference pixel values at the boundaries of blocks U and UR into block C, as depicted in FIGS. 5b, 5c, 5d, respectively. Reference pixels that are marked in grey are connected to one or more predicted pixels. The connection is marked as line with dots to indicate connected predicted pixels the value of the reference pixel is copied to all connected predicted pixels.

Since one or more reference blocks might be unavailable, i.e. their context class may be C0, prediction is performed according to following rules.

Rule 1

If both blocks, U and UR, are classified into one of classes C1-C6, pixel prediction is performed as shown in FIGS. 5b, 5c and 5d respectively. For prediction method P2 (FIG. 5b), pixels without any corresponding reference pixel in block UR are advantageously allocated the value of the rightmost reference pixel in block UR.

Rule 2

If block U is classified into one of classes C1-C6 and block UR is classified as C0, pixel prediction is performed as shown in FIGS. 5b, 5c and 5d for pixels that have a reference pixel in block U. The rest of the pixels are advantageously set to the value of the pixel in the lower right corner of the reference block U.

Rule 3

If block U is classified as C0, the current block C is advantageously filled with pixels having a constant value that is substantially in the middle of the possible dynamic range of pixel values, e.g. 128 (in a system, that uses an 8-bit representation of luminance/chrominance values).

Prediction Method P5 and P9

Prediction methods P5 (FIG. 5e) and P9 (FIG. 5i) predict vertical and horizontal shapes in the current block C by extending image details into the current block C, either from above or from the left. Depending on the selected method (P5 or P9), the reference pixel values at the boundary of either block U or L are copied to the current block C as depicted in FIGS. 5e and 5i.

If the context class of the reference block is C0 then the current block C is advantageously filled with pixels having a constant value that is substantially in the middle of the possible dynamic range of pixel values, e.g. 128 (in a system, that uses an 8-bit representation of luminance/chrominance values).

Prediction Method P6, P7 and P8

Prediction methods P6, P7 and P8 predict diagonal shapes in the current block C by extending image details from the upper left direction into the current block C as depicted in FIGS. 5f, 5g and 5h, respectively. Prediction is performed by copying reference pixel values at the boundaries of blocks L, UL and U into the current block C according to following rules.

Rule 1

If all blocks L, UL and U are classified into one of classes C1-C6, the pixel prediction for the current block C is performed as illustrated in FIGS. 5f, 5g and 5h.

Rule 2

If blocks UL and U are classified into one of classes C1-C6 and block L is classified as C0, pixel prediction for the current block C is performed as shown in FIGS. 5f, 5g and 5h for those pixels of the current block C that have a reference pixel in blocks UL and L. The remaining pixels in the current block C are advantageously assigned the value of the pixel in the lower left corner of the reference pixel area in block UL.

Rule 3

If blocks L and UL are classified into one of classes C1-C6 and block U is classified as C0, pixel prediction for the current block C is performed as shown in FIGS. 5f, 5g and 5h for those pixels of the current block C that have a reference pixel in blocks L and UL. The remaining pixels in the current block C are advantageously assigned the value of the pixel in the upper right corner of the reference pixel area in block UL.

Rule 4

Figure 5O:
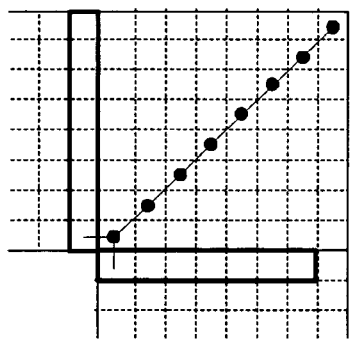
Figure 5N:
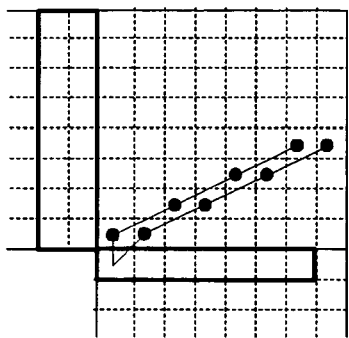

If blocks L and U are classified into one of classes C1-C6 and block UL is classified as C0, pixel prediction for the current block C is performed as shown in FIGS. 5f, 5g and 5h for those pixels of the current block C that have a reference pixel in blocks L and U. Pixels with reference pixel in block UL are predicted as shown in FIGS. 5n, 5o and 5p. In case of method P7, the predicted pixel value is the average of the two reference pixel values rounded to the nearest integer value, as indicated in FIG. 5o.

Rule 5

If block L is classified into one of classes C1-C6 and blocks UL and U are classified as C0, pixel prediction for the current block C is performed as shown in FIGS. 5f, 5g and 5h for those pixels of the current block C that have a reference pixel in block L. The remaining pixels in the current block C are advantageously assigned the value of the pixel in the upper right corner of the reference pixel area in block L.

Rule 6

If block UL is classified into one of classes C1-C6 and blocks L and U are classified as C0, pixel prediction for the current block C is performed as shown in FIGS. 5f, 5g and 5h for those pixels of the current block C that have a reference pixel in blocks UL. Pixels of the current block C that have a reference pixel in block L are advantageously assigned the value of the lower/left reference pixel in block UL. Pixels of the current block C that have a reference pixel in block U are assigned the value of the upper/right reference pixel in block UL.

Rule 7

If block U is classified into one of classes C1-C6 and blocks L and UL are classified as C0, pixel prediction for the current block C is performed as shown in FIGS. 5f, 5g and 5h for those pixels of the current block C that have a reference pixel in block U. The remaining pixels of the current block C are advantageously assigned the value of the pixel in the lower left corner of the reference pixel area in block U.

Rule 8

If all blocks L, UL and L are classified as C0, the current block C is advantageously filled with pixels having a constant value that is substantially in the middle of the possible dynamic range of pixel values, e.g. 128 (in a system, that uses an 8-bit representation of luminance/chrominance values).

Prediction Method P10, P11 and P12

Prediction methods P10 through P12 predict diagonal shapes in the current block C by extending image details from the left into the current block C as depicted in FIGS. 5j, 5k and 5l, respectively. Prediction is performed by copying reference pixel values at the boundary of blocks L into the current block C according to following rules.

Rule 1

If block L is classified into one of classes C1-C6, the pixel prediction for the current block C is performed as illustrated in FIGS. 5j, 5k and 5l. Pixels of the current block C without reference pixel in block L are advantageously filled with the value of the pixel in the lower right corner of the reference pixel area.

Rule 2

If block L is classified as C0, the current block C is advantageously filled with pixels having a constant value that is substantially in the middle of the possible range of pixel values, e.g. 128 (in a system, that uses an 8-bit representation of luminance/chrominance values).

Prediction Method P13

Prediction method P13 predicts the content of the current block C from the neighbouring image content by examining if there exists a range of pixels having values which substantially corresponds to the pixel values of the current block C. The prediction of the current block C is performed by copying reconstructed pixel values from a reference block B that is inside a search range SR as depicted in FIG. 5m. Search range SR is defined by lists of horizontal (x) and vertical (y) displacements. Each pair of horizontal displacement and corresponding vertical displacement values (x, y) defines a displacement vector between the coordinates of upper left corner of the current block C and upper left corner of the reference block B. Prediction is allowed only for those displacements corresponding to reference block B that is completely inside the reconstructed part of the frame. Examples of displacement pairs using 512 displacements for 8×8 blocks are presented in Tables 9a and 9b. In this example the scanning order of the tables is from top-left to bottom-right row by row. In alternative embodiments of the invention, the search range may be different from that depicted in FIG. 5m and/or the displacement between the reference block B and the current block may be defined differently.

The list of allowed displacements is known to both the encoder and the decoder, allowing context-dependent signalling of the selected reference block location.

There are many alternative ways to select the prediction method from a subset of prediction methods. For example, a cost function can be defined in order to evaluate the effectiveness of the different prediction methods of the subset to be used. The cost function may be calculated on the basis of information concerning the error incurred when predicting a current block C using a particular prediction method. This error denotes differences between actual pixel values and reconstructed pixel values. Typically, the error values for each pixel in the current block C are squared and summed together to produce a squared error measure for the whole block. The cost function may also comprise information concerning the number of bits, i.e. the bit rate needed to transfer the information to the receiver. The elements of the cost function, particularly the bit rate, can also be weighted to emphasize them. One example of a cost function is:

$$Cx = D + \lambda R, \quad (4)$$

where cost $Cx$ is defined as a weighted sum of distortion D and rate R associated with each of the prediction methods and $\lambda$ is the weighting factor. If the transmission system is band limited, the weight value is typically larger than if the bandwidth is wider. The values for formula (4) are calculated for different prediction methods and preferably that prediction method which yields the smallest value for the cost function is selected.

Additionally, the prediction error information can also be coded prior to transmission to the receiver. Advantageously, there is a subset of coding methods defined for each prediction method. Specifically, the coding method could be chosen to minimise the number of bits required to encode the prediction error. For example, the effectiveness (bit rate) of the coding method is examined.

If the prediction error is relatively small, it may not be necessary to transmit the prediction error information at all.

Referring once more to FIGS. 1 and 2, once a suitable prediction method has been selected for predicting a current block C, the prediction estimator 3 performs spatial prediction 22 according to the selected prediction method. The prediction estimator 3 directs the reconstructed block to summer 4 where the reconstructed block is subtracted from the actual contents of the current block C to produce prediction error information for the current block.

The encoder 1 sends 23 the information about the selected prediction method to the multiplexer 9, which is accompanied by displacement information if method P13 is used. Advantageously, the selected prediction method is indicated by its rank in the subset of prediction methods appropriate for the particular combination of neighbouring blocks (U, L) in question. Encoding of the information is advantageously performed using variable length coding.

The information is further transmitted to the receiver 10, where the demultiplexer 11 demultiplexes the received information. In the receiver 10 the prediction information is directed to the predictor 16. The receiver 10 also comprises a frame memory 14, where the previously reconstructed blocks are saved. When a new coded block arrives at the receiver, the predictor 16 performs the classifying steps for the neighbouring blocks U, L of the received current block C to classify them into directionality classes, as previously described. Then the predictor 16 carries out the mapping of classification information into context classes C1-C6. After that the predictor 16 also examines the rank of the prediction method. The receiver 10 contains the information of the Table 4 and 5, wherein the predictor 16 can determine the correct prediction method according to the context class combination and the rank.

When the prediction method has been determined, the predictor 16 can reconstruct the current block C and save it to the frame memory 14. In a situation where prediction error information is also received, that information is first decoded in the decoder 12, if necessary, and combined with the pixel values of the reconstructed block C. Now the current block C is ready to be directed to the output 15 of the receiver.

If the prediction method of the current block C is P13, the reconstruction of current block C is performed in a slightly different manner. In this case, the receiver 10 also has to decode the displacement information, wherein the displacement information is used to copy the pixel values of the current block C from previously reconstructed pixel values in the frame memory 14.

Signalling of the prediction method is advantageously based on the context-dependent codes defined in Table 5. After selecting the appropriate prediction method, the encoder 1 sends a variable length codeword that corresponds to the rank of the selected prediction method in the context-dependent subset. Advantageous examples of variable length codewords representing each prediction method rank are listed in Table 5. For example, if the first neighbouring block L is classified into context class C3 and the second neighbouring block U is classified into context class C1, and the prediction method P9 is selected from the subset of the prediction methods for this combination, the respective rank is 2. Then, the codeword which corresponds this rank is "01".

TABLE 5

| Rank | Code | Length |
|---|---|---|
| 1 | 1 | 1 |
| 2 | 01 | 2 |
| 3 | 0000 | 4 |
| 4 | 0001 | 4 |
| 5 | 0010 | 4 |
| 6 | 0011 | 4 |

The receiver 10 is aware of the contents of Table 4, i.e. it knows which prediction method corresponds to each of the ranks in every possible context (combination of classes for the neighbouring blocks L and U). Since the receiver 10 can derive the same context information as the prediction estimator 3, receiver 10 can associate the rank represented by the received codeword to correct prediction method and perform the spatial prediction for block C according to the method.

In an advantageous embodiment of the invention the signalling of horizontal and vertical displacements associated with prediction method P13 is performed as follows:

Step 1

Those pairs of horizontal and vertical displacements (X(i), Y(i)) that correspond to reference blocks B lying partially or entirely outside the frame are eliminated from the ordered list given in Tables 9a, 9b. The number of valid pairs is denoted by Nv and the ordered list of valid pairs which are retained after the elimination is denoted by Lv.

Step 2

The rank r (which is one of 1, 2, ..., Nv) corresponding to the chosen block B within the list Lv created in Step 1 is calculated.

Step 3

Based on the value of rank r determined in Step 1 the value index, is calculated according to Table 6.

Step 4

The value $index_2 = r - OffsetLow(index_1)$ is calculated using the values listed in Table 6.

TABLE 6

| Range for rank r | $index_1$ | OffsetLow ($index_1$) | OffsetHigh ($index_1$) | AuxLength ($index_1$) |
|---|---|---|---|---|
| 1, ..., 2 | 1 | 1 | 2 | 1 |
| 3, ..., 4 | 2 | 3 | 4 | 1 |
| 5, ..., 6 | 3 | 5 | 6 | 1 |
| 7, ..., 8 | 4 | 7 | 8 | 1 |
| 9, ..., 12 | 5 | 9 | 12 | 2 |
| 13, ..., 16 | 6 | 13 | 16 | 2 |
| 17, ..., 24 | 7 | 17 | 24 | 3 |
| 25, ..., 32 | 8 | 25 | 32 | 3 |
| 33, ..., 48 | 9 | 33 | 48 | 4 |
| 49, ..., 64 | 10 | 49 | 64 | 4 |
| 65, ..., 96 | 11 | 65 | 96 | 5 |
| 97, ..., 128 | 12 | 97 | 128 | 5 |
| 129, ..., 192 | 13 | 129 | 192 | 6 |
| 193, ..., 256 | 14 | 193 | 256 | 6 |
| 257, ..., 384 | 15 | 257 | 384 | 7 |
| 385, ..., 512 | 16 | 385 | 512 | 7 |

Step 5

Next, a variable bits is calculated as follows. If $Nv < OffsetHigh(index_1)$, the value for the variable bits is computed advantageously using the formula bits=[log 2(1+ Nv−OffsetLow(index1))], where [x] denotes the nearest integer≧x. Otherwise, bits=AuxLength(index1).

Step 6

Depending on the value of Nv the variable whose subscript is $index_1$ is encoded using the corresponding Variable Length Coding given in Table 7 and Table 8. This codeword is transmitted to the decoder, which is illustrated with block CW1 in FIG. 6.

Step 7

If the variable bits is nonzero the binary representation of index2 is encoded using a number of bits corresponding to the value of variable bits and this codeword is transmitted to the receiver, which is illustrated with block CW2 in FIG. 6.

TABLE 7

| $N_V$ in range 1, ..., 16 VLC$_A$ | | | $N_V$ in range 17, ..., 32 VLC$_B$ | | | $N_V$ in range 33, ..., 64 VLC$_C$ | | |
|---|---|---|---|---|---|---|---|---|
| Symbol | Length | Code | Symbol | Length | Code | Symbol | Length | Code |
| $A_1$ | 2 | 11 | $B_1$ | 1 | 1 | $C_1$ | 2 | 11 |
| $A_2$ | 3 | 001 | $B_2$ | 2 | 01 | $C_2$ | 3 | 101 |
| $A_3$ | 2 | 10 | $B_3$ | 4 | 0011 | $C_3$ | 4 | 0011 |
| $A_4$ | 4 | 0001 | $B_4$ | 4 | 0010 | $C_4$ | 5 | 00001 |
| $A_5$ | 2 | 01 | $B_5$ | 5 | 00011 | $C_5$ | 3 | 100 |
| $A_6$ | 4 | 0000 | $B_6$ | 5 | 00010 | $C_6$ | 4 | 0010 |
| | | | $B_7$ | 5 | 00001 | $C_7$ | 4 | 0001 |
| | | | $B_8$ | 5 | 00000 | $C_8$ | 5 | 00000 |
| | | | | | | $C_9$ | 3 | 011 |
| | | | | | | $C_{10}$ | 3 | 010 |

TABLE 8

| $N_V$ in range 65, ..., 128 VLC$_D$ | | | $N_V$ in range 129, ..., 256 VLC$_E$ | | | $N_V$ in range 257, ..., 512 VLC$_F$ | | |
|---|---|---|---|---|---|---|---|---|
| Symbol | Length | Code | Symbol | Length | Code | Symbol | Length | Code |
| $D_1$ | 2 | 11 | $E_1$ | 2 | 11 | $F_1$ | 3 | 111 |
| $D_2$ | 3 | 101 | $E_2$ | 3 | 101 | $F_2$ | 4 | 1011 |
| $D_3$ | 5 | 00001 | $E_3$ | 4 | 0111 | $F_3$ | 4 | 1010 |
| $D_4$ | 5 | 00000 | $E_4$ | 5 | 00011 | $F_4$ | 6 | 000001 |
| $D_5$ | 4 | 0111 | $E_5$ | 4 | 0110 | $F_5$ | 4 | 1001 |
| $D_6$ | 4 | 0110 | $E_6$ | 5 | 00010 | $F_6$ | 5 | 00001 |
| $D_7$ | 3 | 100 | $E_7$ | 4 | 0101 | $F_7$ | 4 | 1000 |
| $D_8$ | 4 | 101 | $E_8$ | 4 | 0100 | $F_8$ | 4 | 0111 |
| $D_9$ | 4 | 0100 | $E_9$ | 3 | 100 | $F_9$ | 4 | 0110 |
| $D_{10}$ | 4 | 0011 | $E_{10}$ | 4 | 0011 | $F_{10}$ | 4 | 0101 |
| $D_{11}$ | 4 | 0010 | $E_{11}$ | 4 | 0010 | $F_{11}$ | 4 | 0100 |
| $D_{12}$ | 4 | 0001 | $E_{12}$ | 5 | 00001 | $F_{12}$ | 4 | 0011 |
| | | | $E_{13}$ | 6 | 000001 | $F_{13}$ | 3 | 110 |
| | | | $E_{14}$ | 6 | 000000 | $F_{14}$ | 4 | 0010 |
| | | | | | | $F_{15}$ | 4 | 0001 |
| | | | | | | $F_{16}$ | 6 | 000000 |

TABLE 9a

X[512]=

| | | | | | | | | | | | | | | | |
|---|---|---|---|---|---|---|---|---|---|---|---|---|---|---|---|
| −8 | −8 | −8 | −1 | −10 | −8 | 0 | 1 | −16 | −9 | −8 | −8 | −18 | −8 | −12 | −11 |
| −14 | −11 | −19 | −15 | −10 | −10 | −9 | −16 | −9 | −9 | −14 | −13 | −13 | −2 | −12 | −11 |
| −8 | 3 | −15 | 0 | −19 | −15 | −3 | 0 | −10 | 11 | 2 | −13 | −11 | 0 | −12 | −19 |
| 1 | −18 | −17 | −11 | −10 | −14 | −1 | 18 | −7 | −5 | −12 | −10 | −8 | −13 | −9 | −9 |
| 0 | −14 | 21 | 5 | −3 | 10 | −10 | −15 | −14 | −13 | 19 | −11 | −10 | −11 | 14 | 0 |
| −19 | −13 | −16 | 4 | −12 | −4 | −16 | 3 | 12 | −13 | −19 | 7 | −19 | −13 | −4 | −15 |
| −10 | 1 | −12 | −17 | 0 | 0 | −16 | −16 | −15 | −11 | 1 | −16 | −18 | −12 | −8 | −18 |
| −15 | −6 | 0 | −13 | −18 | −2 | 16 | 17 | −12 | −9 | 2 | 8 | −12 | 16 | 18 | −9 |
| −19 | −19 | 4 | −11 | −18 | −18 | 0 | 15 | 15 | 19 | −6 | −14 | 16 | 14 | −16 | 8 |
| −16 | −17 | 13 | 0 | −1 | −12 | 16 | −17 | −8 | −16 | −16 | −1 | −15 | −1 | −18 | −17 |
| 5 | 6 | 4 | 8 | 5 | −11 | −16 | −2 | −7 | 2 | −14 | 4 | −17 | −13 | −2 | 13 |
| −5 | −18 | −19 | −17 | −9 | −6 | −16 | 13 | −15 | 0 | 13 | −19 | 6 | −5 | −14 | −5 |
| 1 | −19 | −1 | −17 | −12 | −13 | −6 | 12 | −8 | −13 | −14 | 3 | 17 | −14 | −14 | −11 |
| 12 | −1 | 5 | −11 | −2 | −4 | 3 | −1 | −2 | 5 | −9 | 1 | −12 | 14 | 9 | 1 |
| −9 | 20 | −19 | 18 | −17 | −1 | −12 | −3 | 4 | −17 | 13 | −12 | −17 | −5 | −4 | −17 |
| −4 | −8 | 9 | 1 | −15 | 8 | 7 | −1 | 13 | 8 | −3 | −6 | −3 | −12 | −16 | −13 |
| −5 | 16 | −13 | 15 | −19 | −15 | 2 | 12 | 11 | −15 | 14 | −15 | −5 | 7 | 11 | −15 |
| −4 | 20 | −7 | 4 | 17 | 15 | −14 | 3 | −10 | −14 | −15 | −15 | 14 | 1 | −11 | 12 |
| 10 | 14 | 5 | 13 | −9 | −3 | −12 | 17 | −17 | 11 | 9 | −3 | −1 | 3 | 11 | −18 |
| −18 | −8 | −3 | 7 | −4 | −13 | −14 | −17 | 8 | −10 | −6 | 16 | −7 | 19 | −8 |
| 1 | −10 | 19 | 6 | 10 | 4 | 13 | 20 | 3 | 8 | −18 | 4 | 15 | 1 | −8 | −11 |
| −2 | −6 | 3 | 6 | −14 | 9 | −16 | −2 | −14 | −8 | 6 | −7 | −17 | 7 | 6 | 16 |
| −13 | 5 | 5 | 4 | −10 | −3 | −13 | 10 | 17 | 2 | 6 | 11 | −13 | −9 | −16 | −14 |
| −7 | −2 | 6 | −18 | 9 | −8 | −11 | −7 | 7 | 8 | 5 | 9 | −3 | 6 | −12 | −7 |
| −4 | 12 | 12 | −8 | −6 | −9 | −11 | 12 | −5 | 12 | −11 | 4 | −14 | 8 | 10 | 5 |
| 19 | −4 | −12 | −2 | −3 | −4 | 7 | 12 | 14 | 15 | −6 | 7 | 7 | 4 | 11 | 11 |
| −18 | −6 | −7 | 18 | 10 | −10 | −10 | 2 | −1 | −10 | −8 | 2 | −9 | 13 | 11 | 11 |
| 17 | 15 | 13 | 2 | 10 | −7 | −10 | 14 | −2 | 4 | 5 | 12 | −3 | −4 | 17 | −5 |

TABLE 9a-continued

X[512]=

| 7 | 10 | 13 | 3 | 6 | -6 | -6 | -11 | 9 | 9 | 2 | -9 | -12 | 3 | -9 | -10 |
|---|---|---|---|---|---|---|---|---|---|---|---|---|---|---|---|
| 6 | 3 | 14 | 11 | 9 | 8 | -5 | -7 | 10 | 7 | -12 | 14 | 1 | 5 | -13 | 2 |
| -11 | 18 | 11 | 12 | -4 | -5 | -9 | -10 | -9 | 16 | 7 | 15 | 9 | 9 | 10 | 2 |
| 18 | 10 | 8 | 10 | 15 | -15 | 3 | -5 | -9 | 7 | -2 | 2 | 9 | 6 | 11 | -10 |

TABLE 9b

Y[512]=

| -1 | -2 | -3 | -8 | -2 | 0 | -8 | -8 | 0 | -2 | -4 | -6 | 0 | -5 | 0 | -2 |
|---|---|---|---|---|---|---|---|---|---|---|---|---|---|---|---|
| 0 | 0 | -1 | 0 | -1 | 0 | -4 | -1 | -1 | 0 | -3 | -2 | 0 | -8 | -2 | -1 |
| -7 | -8 | -2 | -14 | 0 | -4 | -8 | -18 | -7 | -8 | -8 | -3 | -5 | -16 | -1 | -4 |
| -19 | -13 | 0 | -8 | -6 | -2 | -19 | -8 | -8 | -8 | -9 | -4 | -8 | -1 | -5 | -3 |
| -15 | -6 | -8 | -8 | -9 | -8 | -3 | -5 | -8 | -6 | -10 | -3 | -5 | -4 | -8 | -12 |
| -7 | -10 | -15 | -8 | -4 | -8 | -2 | -9 | -9 | -5 | -10 | -8 | -3 | -11 | -9 | -6 |
| -8 | -11 | -7 | -3 | -10 | -13 | -8 | -3 | -3 | -6 | -16 | -12 | -3 | -3 | -9 | -4 |
| -1 | -8 | -9 | -7 | -5 | -10 | -8 | -8 | -5 | -7 | -9 | -8 | -6 | -9 | -13 | -6 |
| -2 | -5 | -9 | -9 | -1 | -10 | -11 | -16 | -8 | -9 | -9 | -4 | -12 | -10 | -4 | -9 |
| -5 | -4 | -10 | -17 | -16 | -19 | -11 | -6 | -19 | -9 | -10 | -9 | -16 | -12 | -8 | -8 |
| -19 | -8 | -17 | -19 | -10 | -7 | -11 | -14 | -19 | -10 | -1 | -19 | -2 | -8 | -9 | -11 |
| -19 | -7 | -8 | -1 | -8 | -19 | -7 | -16 | -8 | -19 | -9 | -11 | -9 | -10 | -11 | -12 |
| -18 | -6 | -11 | -11 | -10 | -14 | -10 | -19 | -18 | -18 | -10 | -16 | -12 | -5 | -7 | -12 |
| -8 | -18 | -17 | -15 | -12 | -19 | -18 | -10 | -11 | -9 | -10 | -13 | -13 | -11 | -8 | -12 |
| -15 | -9 | -9 | -10 | -10 | -17 | -12 | -16 | -12 | -14 | -8 | -8 | -7 | -9 | -17 | -12 |
| -12 | -16 | -16 | -9 | -11 | -17 | -19 | -14 | -18 | -16 | -12 | -14 | -15 | -18 | -6 | -4 |
| -17 | -10 | -9 | -9 | -12 | -14 | -12 | -10 | -19 | -12 | -17 | -7 | -11 | -12 | -16 | -9 |
| -13 | -8 | -9 | -16 | -14 | -10 | -13 | -11 | -14 | -12 | -10 | -13 | -16 | -10 | -19 | -13 |
| -12 | -12 | -15 | -17 | -16 | -10 | -17 | -10 | -5 | -16 | -18 | -18 | -13 | -19 | -9 | -6 |
| -2 | -17 | -19 | -11 | -10 | -15 | -15 | -13 | -14 | -18 | -19 | -17 | -15 | -13 | -8 | -14 |
| -14 | -11 | -12 | -14 | -11 | -13 | -14 | -10 | -10 | -10 | -9 | -14 | -12 | -17 | -10 | -18 |
| -13 | -12 | -17 | -18 | -14 | -10 | -14 | -19 | -9 | -12 | -10 | -11 | -9 | -9 | -16 | -14 |
| -13 | -16 | -12 | -10 | -9 | -14 | -12 | -15 | -13 | -16 | -12 | -18 | -17 | -13 | -13 | -16 |
| -12 | -15 | -17 | -11 | -17 | -15 | -13 | -15 | -17 | -15 | -11 | -15 | -17 | -11 | -14 | -14 |
| -14 | -14 | -15 | -13 | -16 | -18 | -17 | -16 | -15 | -17 | -14 | -15 | -17 | -13 | -19 | -13 |
| -11 | -16 | -16 | -16 | -11 | -15 | -15 | -12 | -9 | -13 | -18 | -16 | -13 | -18 | -17 | -10 |
| -12 | -11 | -10 | -12 | -9 | -15 | -13 | -14 | -15 | -17 | -11 | -18 | -9 | -13 | -14 | -15 |
| -11 | -11 | -15 | -11 | -17 | -16 | -12 | -15 | -18 | -11 | -14 | -18 | -13 | -18 | -9 | -13 |
| -17 | -14 | -12 | -14 | -19 | -13 | -15 | -10 | -9 | -12 | -19 | -17 | -15 | -12 | -14 | -16 |
| -15 | -15 | -14 | -11 | -11 | -11 | -14 | -18 | -10 | -10 | -11 | -13 | -15 | -18 | -16 | -15 |
| -11 | -11 | -12 | -11 | -11 | -16 | -11 | -10 | -12 | -13 | -14 | -14 | -14 | -19 | -16 | -13 |
| -9 | -18 | -12 | -13 | -15 | -15 | -13 | -18 | -19 | -18 | -17 | -17 | -13 | -13 | -13 | -18 |

Since the decoder can derive the ordered list of valid displacement vectors, it can associate the rank represented by the received codeword with the correct displacement vector.

The block carrying out prediction method according to the invention is particularly advantageously implemented in a digital signal processor or a corresponding general purpose device suited to processing digital signals, which can be programmed to apply predetermined processing functions to signals received as input data. The measures according to the invention can be carried out in a separate signal processor or they can be part of the operation of such a signal processor which also contains other arrangements for signal processing.

A storage medium can be used for storing a software program comprising machine executable steps for performing the method according to the invention. In an advantageous embodiment of the invention the software program can be read from the storage medium to a device comprising programmable means, e.g. a processor, for performing the method of the invention.

A mobile terminal 24 intended for use as a portable video telecommunications device and applying the method according to the invention comprises advantageously at least display means 25 for displaying images, audio means 26 for capturing and reproducing audio information, a keyboard 27 for inputting e.g. user commands, a radio part 28 for communicating with mobile network, processing means 29 for controlling the operation of the device, memory means 30 for storing information, and preferably a camera 31 for taking images.

The present invention is not solely restricted to the above presented embodiments, but it can be modified within the scope of the appended claims.

The invention claimed is:

1. A method for encoding a digital image in a block-based manner, in which a spatial prediction for a block is performed to reduce amount of information to be transmitted, wherein the method comprises:
   determining a classification for at least two neighboring blocks of a block to be predicted according to the image contents of said neighboring blocks;
   selecting a sub-set of prediction methods from a set of available prediction methods on the basis of the classifications of said at least two neighboring blocks;
   defining an arrangement for the list of said sub-set of prediction methods in a rank order, said rank order determined on the basis of the classifications of said at least two neighboring blocks, wherein each prediction method in the said list has a unique rank with respect to each of the other prediction methods;
selecting a prediction method for the block to be predicted from said sub-set of prediction methods;
forming a spatial prediction for the block to be predicted using the selected prediction method; and
providing a signal representative of rank of the selected prediction method.

2. A method according to claim 1, comprising calculating a cost function representative of an error incurred when using a particular prediction method to form a spatial prediction for the block to be predicted and selecting the prediction method for the block to be predicted from said sub-set of prediction methods that yields the smallest value for the cost function.

3. A method according to claim 2, wherein the cost function includes a measure of an error incurred when using a particular prediction method to form a spatial prediction for the block to be predicted and a measure of an amount of information required to be transmitted to a corresponding decoder when said particular prediction method is selected.

4. A method according to claim 1, wherein the classification for a neighboring block is determined on the basis of directionality in the image contents of the neighboring block.

5. A method for decoding an encoded digital image in a block-based manner, in which a spatial prediction for a block is performed to reduce amount of information to be transmitted, wherein the method comprises:
determining a classification for at least two neighboring blocks of a block to be predicted according to the image contents of said neighboring blocks;
selecting a sub-set of prediction methods from a set of available prediction methods on the basis of the classifications of said at least two neighboring blocks;
defining an arrangement for the list of said sub-set of prediction methods in a rank order, said rank order determined on the basis of the classifications of said at least two neighboring blocks, wherein each prediction method in the said list has a unique rank with respect to each of the other prediction methods;
receiving a signal indicative of rank order prediction method in said sub-set of prediction methods;
selecting a prediction method for the block to be predicted from said list of said sub-set of prediction methods, said prediction method having said rank order; and
forming a spatial prediction for the block to be predicted using the selected prediction method.

6. A method according to claim 5, wherein the classification for a neighboring block is determined on the basis of directionality in the image contents of the neighboring block.

7. An encoder for encoding a digital image in a block-based manner, the encoder being arranged to perform a spatial prediction for a block to reduce an amount of information to be transmitted, wherein the encoder comprises:
a block classifier arranged to determine a classification for at least two neighboring blocks of a block to be predicted according to the image contents of said neighboring blocks;
a prediction method selector arranged to:
select a sub-set of prediction methods from a set of available prediction methods on the basis of the classifications of said at least two neighboring blocks;
define an arrangement for the list of said sub-set of prediction methods in a rank order, said rank order determined on the basis of the classifications of said at least two neighboring blocks, wherein each prediction method in the said list has a unique rank with respect to each of the other prediction methods; and
select a prediction method for the block to be predicted from said sub-set of prediction methods;
a prediction estimator to form a spatial prediction for the block to be predicted using the selected prediction method; and
a multiplexing unit to provide a signal representative of rank of the selected prediction method.

8. An encoder according to claim 7, comprising a cost function calculator for calculating a cost function representative of an error incurred when using a particular prediction method for forming a spatial prediction for the block to be predicted and the prediction method selector is arranged to select the prediction method for the block to be predicted from said sub-set of prediction methods that yields the smallest value for the cost function.

9. An encoder according to claim 8, wherein the cost function includes a measure of an error incurred when using a particular prediction method to form a spatial prediction for the block to be predicted and a measure of an amount of information required to be transmitted to a corresponding decoder when said particular prediction method is selected.

10. An encoder according to claim 7, wherein the classification for a neighboring block is determined on the basis of directionality in the image contents of the neighboring block.

11. A decoder for decoding an encoded digital image in a block-based manner, the decoder being arranged to perform a spatial prediction for a block to reduce an amount of information to be transmitted, wherein the decoder comprises:
a block classifier arranged to determine a classification for at least two neighboring blocks of a block to be predicted according to the image contents of said neighboring blocks;
a prediction method selector for:
selecting a sub-set of prediction methods from a set of available prediction methods on the basis of the classifications of said at least two neighboring blocks; and
defining an arrangement for the list of said sub-set of prediction methods in a rank order, said rank order determined on the basis of the classifications of said at least two neighboring blocks, wherein each prediction method in the said list has a unique rank with respect to each of the other prediction methods;
a demultiplexing unit for receiving a signal indicative of rank order prediction method in said sub-set of prediction methods;
the prediction method selector further arranged to select a prediction method for the block to be predicted from said list of said sub-set of prediction methods, said prediction method having said rank order; and
a prediction estimator to form a spatial prediction for the block to be predicted using the selected prediction method.

12. A method according to claim 11, wherein the classification for a neighboring block is determined on the basis of directionality in the image contents of the neighboring block.

* * * * *